Nov. 15, 1955  W. R. TAYLOR ET AL  2,723,415
CASTER WHEEL
Filed Dec. 2, 1954
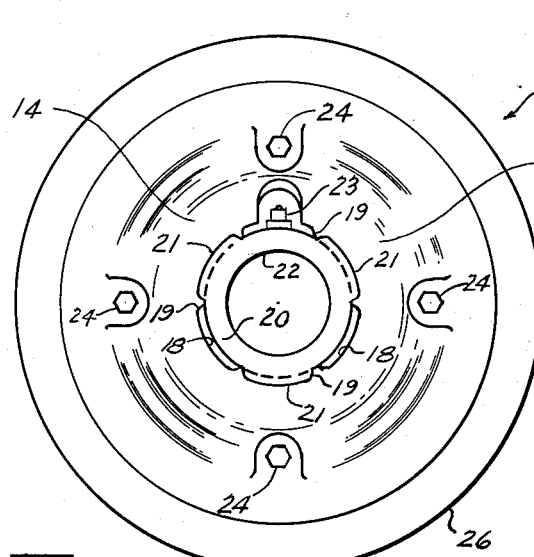
*Fig. 1.*
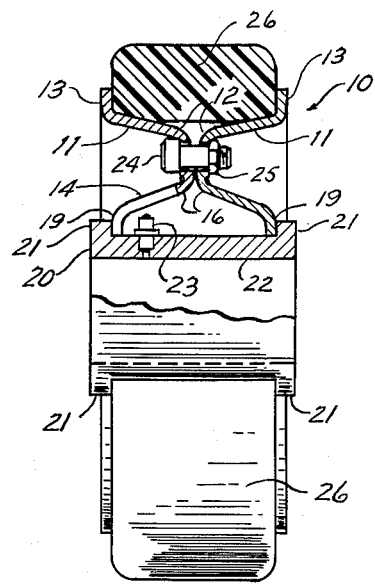
*Fig. 2.*
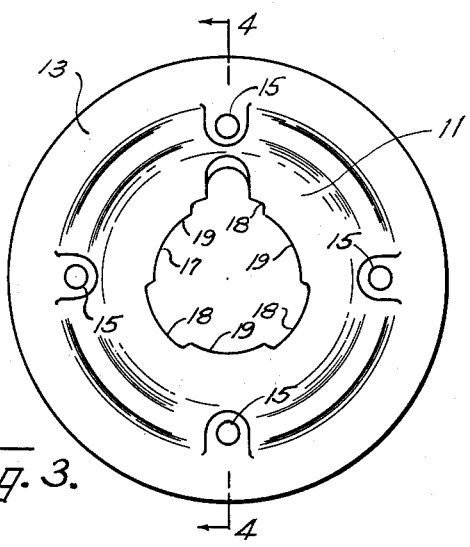
*Fig. 3.*
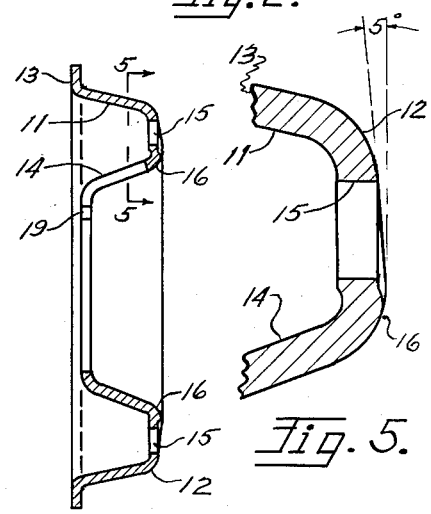
*Fig. 4.*  *Fig. 5.*
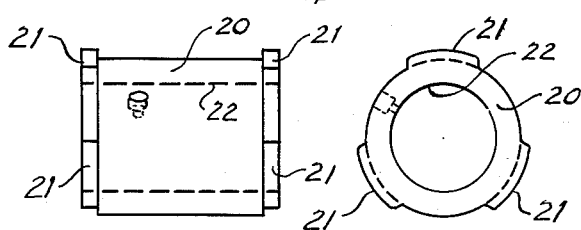
*Fig. 6.*  *Fig. 7.*
INVENTORS
WILLIAM R. TAYLOR
AND HOWARD J. LOUGHEED
BY Sanford Schnurmacher
ATTORNEY United States Patent Office 2,723,415
Patented Nov. 15, 1955

2,723,415

CASTER WHEEL

William R. Taylor and Howard J. Lougheed, Jackson, Mich., assignors to The Taylor-Lougheed Co., Napoleon, Mich., a corporation of Michigan Application December 2, 1954, Serial No. 472,580

5 Claims. (Cl. 16—45)

This invention relates to wheels and particularly to caster wheels.

Conducive to a better understanding of this invention, it may be well to point out that caster wheels having rubber or plastic tires are used extensively in industry on material handling vehicles. These are used primarily to move raw materials and semi-finished components from one operation to another. In the course of time, the caster tires wear out as well as the axle bearings or bushings. In some structures in general use these parts cannot be replaced and therefore an entirely new wheel must be substituted for the worn one. In other designs the caster tire can be replaced, but only by the use of special machinery, which is expensive and also means that extra caster wheels must be carried in stock to take the place of the worn wheel while it is being repaired. Or lacking that, the particular truck or table must be out of service for a prolonged period while the wheel is sent to the repair shop.

The primary object of this invention, therefore, is to provide a caster wheel having a replaceable tire and axle bushing.

Another object is to provide a caster wheel of the type having a molded rubber or plastic tire that can be dismantled for replacement of the relatively inexpensive tire by the use of an ordinary hand wrench, no complicated machinery, fixtures or presses being required.

A further object is to provide a caster wheel made up of two simple and identical sheet metal stampings.

Still another object is to provide a caster wheel that is rugged in structure, reliable in operation and relatively inexpensive to manufacture.

These and other objects of the invention will become apparent from a reading of the following specification and claims, together with the accompanying drawing wherein:

Figure 1 is a front elevation of the assembled caster wheel that is the subject of this invention;

Figure 2 is a right end view of the same, partly in section;

Figure 3 is a front elevation of one of the metal discs;

Figure 4 is a vertical sectional view of one of the metal discs taken along the line and in the direction of the arrows 4—4 of the Figure 3;

Figure 5 is an enlarged sectional view through the annular fulcrum, taken along the line and in the direction of the arrows 5—5 of the Figure 4;

Figure 6 is a front elevation of the bushing; and

Figure 7 is a right end view of the same.

Referring more specifically to the drawing, there is seen in the Figures 1 and 2 the caster wheel that is the subject of this invention, broadly indicated by the reference numeral 10.

The wheel comprises two identical sheet metal stampings or discs 11 preferably made of 12-gauge steel, although any other material having the required physical properties may be used. Each disc 11 has a circular body portion 12 having an annular fulcrum 16 offset at an angle of approximately 5° to the plane of the body 12, as is seen most clearly in Figure 5.

Reference numeral 13 indicates an upwardly and outwardly extending circular rim portion formed integral with the body and which acts as a seat for the molded rubber or plastic tire 26.

Reference numeral 14 indicates a downwardly and outwardly extending circular hub supporting portion formed integral with the body 11 at the fulcrum 16. The hub supporting portion 14 has a central opening or hole 17 therethrough.

Reference numeral 18 indicates three equally spaced radial notches which define spaced fingers 19 therebetween, as is seen most clearly in Figure 3. The body 12 has four holes 15 spaced 90° apart, located between the annular fulcrum 16 and the rim portion 13.

In assembling the caster wheel, two discs 11 are positioned on either side of the tire 26 with their rims 13 resting against both tire edges and their annular fulcrums 16 in contact as illustrated in Figure 2. Threaded clamping bolts 24 are then passed through the aligned holes 15 of the two discs and drawn up lightly by means of nuts 25. When so positioned, the central holes 17 of the two discs are aligned to form a cell therebetween for the reception of the axle hub 20. The hub 20 is cylindrical in shape with a central bore 22 therethrough for the reception of the axle (not shown) upon which the caster wheel rotates.

Reference numeral 21 indicates laterally extending lugs formed integral with the hub and positioned at the extreme ends thereof. There are three of these lugs equispaced around each end of the hub and aligned longitudinally thereof as shown in Figures 6 and 7. The width, height and spacing of these lugs corresponds to the width, depth and spacing of the disc notches 18. The configuration of the lugs is such that they will just pass through the notch 18. The distance between the inner faces of the lugs at either end of the bushing is the same as that between the outer faces of the fingers 19 when the two discs are joined as described hereinabove.

Reference numeral 23 indicates a grease fitting such as manufactured under the trade mark "Zerk." However, any similar means may be used to introduce a lubricant into the axial bore 22 of the hub 20.

The hub just described is mounted in the central hole of the assembly wheel by aligning the lugs 21 with the notches 18 and pushing the bushing through the opening 17 and positioning it therein with the inner faces of the lugs 21 aligned with the outer faces of the fingers 19. The hub is then twisted ⅓ of a rotation which will cause the lugs to be aligned with the fingers 19, with the inner faces of the lugs pressed against the outer faces of the fingers. In this position, the bushing cannot be moved axially of the wheel discs 11.

The four clamping bolts 24 are then drawn up equally by rotating their nuts 25. It will be noted that, due to the angular offsetting of the annular fulcrums 16, the only contact between the discs 11 occurs at this point, the body portions 12 of the joined discs being spaced a distance apart.

The tightening of the clamp bolts 24 therefore causes the discs 11 to pivot toward one another on the annular fulcrum 16. This in turn causes the upper or rim portions 13 of the discs to be tilted inwardly toward one another to bear against the side walls of the tire 26 which causes the tire to be securely locked on the rim against any lateral movement in either direction. At the same time, the hub engaging fingers 19 are caused to tilt outwardly and away from one another in pressed locked engagement with the inner faces of the lugs 21 of the hub 20. Inasmuch as the clearance between the fingers and lugs is originally very close, an outward tilting of the fingers 19 only a few thousandths of an inch will lock the hub securely in place against relative rotation to the disc fingers 19. Thus the discs, tire and hub are firmly locked together to form rigid caster wheel assembly.

To replace a worn tire or hub, it is only necessary to release the bolts and disassemble the parts in reverse order. It will be noted that the only tools required is a common spanner or socket wrench. Thus, a relatively expensive caster wheel can be reconditioned within a few minutes by the replacement of a relatively inexpensive tire element. Furthermore, the supported table, box or truck is withdrawn from productive service for only a very short time since it need not be removed from the area in which it is being used to be repaired.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

We claim:

1. A caster wheel, comprising in combination, a pair of identical circular disc members having a single annular contact fulcrum therebetween, each of the discs having a hub engaging edge defining a central hole therethrough and a peripheral tire supporting rim element, a tire and hub seated on and in the rim and central hole respectively, and a plurality of radially spaced clamping means engaged with said paired discs and positioned between the annular contact fulcrum and the rim elements, the said clamping means acting to pivot the discs on their annular contact point to tilt the rim elements inwardly into locked engagement with the tire and simultaneously acting to tilt the hub engaging edges outwardly into locked engagement with the hub seated in the central hole.

2. A caster wheel, comprising in combination, a pair of identical circular disc members, each of said discs having a body portion including an annular fulcrum offset at an angle to the plane of said body, the body also having an upwardly and outwardly extending circular rim portion formed integral therewith and an integral circular hub supporting portion extending downwardly and outwardly of said annular fulcrum, said hub supporting portion having a hub engaging edge defining a central hole, a tire and hub seated on and in the rim and central hole, respectively, and a plurality of radially spaced clamping means engaged with said paired discs and positioned on the body between the fulcrum and the rim, the said clamping means acting to draw the discs together on their annular fulcrums, thereby causing their respective rim elements to tilt inwardly into locked engagement with the tire and simultaneously causing their hub engaging edges to tilt outwardly into locked engagement with the hub seated in the central hole.

3. A caster wheel, comprising in combination, a pair of identical circular disc members having a single annular contact fulcrum therebetween, each of the discs having a peripheral tire supporting rim element and a hub engaging edge defining a central hole therethrough, the hub engaging edge having spaced circumferential notches therein defining spaced fingers therebetween, a tire seated on the rim, a tubular hub having laterally extending spaced lugs positioned at both ends thereof mounted in the center hole with the inner faces of the lugs engaged with the outer faces of the fingers, a plurality of radially spaced clamping means engaged with said paired discs between the annular contact fulcrum and the rim elements, the said clamping means acting to pivot the discs on their annular contact fulcrum to tilt the rim elements inwardly into locked engagement with the tire and simultaneously acting to tilt the hub engaging fingers outwardly into locked engagement with the lugs of the hub seated in the central hole.

4. A caster wheel, comprising in combination, a pair of identical circular disc members, each of said discs having a body portion including an annular fulcrum offset at an angle to the plane of said body, the body also having an upwardly and outwardly extending circular rim portion formed integral therewith and an integral circular hub supporting portion extending downwardly and outwardly of said annular fulcrum, said hub supporting portion having a hub engaging edge defining a central hole, the hub engaging edge having spaced circumferential notches therein defining spaced fingers therebetween, a tire mounted on the rim, a tubular hub having laterally extending spaced lugs positioned at both ends thereof, mounted in the central hole with the inner faces of the lugs engaged with the outer faces of the fingers, and a plurality of radially spaced clamping means engaged with said paired discs, positioned on the body between the annular fulcrum and the rim elements, the said clamping means acting to draw the body members together and pivot the discs on the annular fulcrum to tilt the rim elements inwardly into locked engagement with the tire and simultaneously acting to tilt the hub engaging fingers outwardly into locked engagement with the lugs of the hub seated in the central hole.

5. A device of the type defined in claim 4 and further characterized by the annular fulcrum being set at an approximate angle of five degrees to the plane of the body member.

No references cited.